US007062025B2

(12) United States Patent
Summers et al.

(10) Patent No.: US 7,062,025 B2
(45) Date of Patent: Jun. 13, 2006

(54) INTERNET-ENABLED CONFERENCING SYSTEM AND METHOD ACCOMMODATING PSTN AND IP TRAFFIC

(75) Inventors: J. Larry Summers, Addison, TX (US); Paul D. Harmon, Plano, TX (US); Trey H. Smith, Frisco, TX (US)

(73) Assignee: eMeeting.net, Inc., Dallas, TX (US)

( * ) Notice: Subject to any disclaimer, the term of this patent is extended or adjusted under 35 U.S.C. 154(b) by 0 days.

(21) Appl. No.: 11/098,114

(22) Filed: Apr. 4, 2005

(65) Prior Publication Data

US 2005/0180342 A1  Aug. 18, 2005

Related U.S. Application Data

(63) Continuation of application No. 09/515,338, filed on Feb. 29, 2000, now Pat. No. 6,876,734.

(51) Int. Cl.
*H04M 3/42* (2006.01)
(52) U.S. Cl. .................. 379/202.01; 370/260; 370/261
(58) Field of Classification Search ............. 379/88.17, 379/93.21, 158, 201.12, 202.01, 205.01; 370/260, 261, 262; 709/204
See application file for complete search history.

(56) References Cited

U.S. PATENT DOCUMENTS

| 3,692,947 A | 9/1972 | Lewis .................... 179/18 BC |
|---|---|---|
| 4,109,111 A | 8/1978 | Cook .................... 179/18 BC |
| 4,541,087 A | 9/1985 | Comstock .................... 370/62 |
| 4,937,856 A | 6/1990 | Natarajan .................... 379/158 |
| 5,475,747 A | 12/1995 | Bales et al. .................. 379/201 |
| 5,483,588 A | 1/1996 | Eaton et al. .................. 379/202 |
| 5,903,629 A | 5/1999 | Campbell, IV et al. .. 379/88.24 |
| 5,963,913 A | 10/1999 | Henneuse et al. ............. 705/9 |
| 5,978,463 A | 11/1999 | Jurkevics et al. ........... 379/202 |
| 6,067,027 A | 5/2000 | Buer .......................... 340/687 |
| 6,118,864 A | 9/2000 | Chang et al. ................ 379/225 |
| 6,141,341 A | 10/2000 | Jones et al. .................. 370/352 |
| 6,275,575 B1 | 8/2001 | Wu ....................... 379/202.01 |
| 6,304,648 B1 | 10/2001 | Chang ................... 379/202.01 |
| 6,320,944 B1 | 11/2001 | Schlossman et al. ....... 379/117 |
| 6,330,321 B1 | 12/2001 | Detampel, Jr. et al. . 379/205.01 |
| 6,363,079 B1 | 3/2002 | Barzegar et al. ............ 370/465 |
| 6,370,393 B1 | 4/2002 | Otsuka et al. .............. 455/555 |

(Continued)

OTHER PUBLICATIONS

J. Larry Summers et al., "Internet-Enabled Conferencing System and Method Accommodating PSTN and IP Traffic," U.S. Appl. No. 09/515,338, 45 pages, filed Feb. 29, 2000.

(Continued)

*Primary Examiner*—Bing Q. Bui
(74) *Attorney, Agent, or Firm*—Baker Botts L.L.P.

(57) ABSTRACT

A system for scheduling a conference between callers includes a database that stores scheduling information indicating at least a start time, a duration, and a maximum number of callers for one or more scheduled conferences, the scheduling information reflecting available conferencing resources. A server complex coupled to the database communicates, to a requesting Internet Protocol (IP) user, at least one page including one or more scheduling input fields. The server complex receives scheduling input from the requesting IP user for a requested conference according to the scheduling input fields. The server complex accesses the database to determine, according to the scheduling input, whether sufficient resources are available for the requested conference. If so, the server complex allocates at least some available resources to the requested conference and generates confirmations of the requested conference for communication to the callers.

22 Claims, 7 Drawing Sheets

U.S. PATENT DOCUMENTS

| | | | |
|---|---|---|---|
| 6,404,764 B1 | 6/2002 | Jones et al. | 370/352 |
| 6,411,605 B1 | 6/2002 | Vance et al. | 370/261 |
| 6,418,214 B1 | 7/2002 | Smythe et al. | 379/202.01 |
| 6,424,646 B1 | 7/2002 | Gerszberg et al. | 370/352 |
| 6,453,034 B1 | 9/2002 | Donovan et al. | 379/220.01 |
| 6,463,051 B1 | 10/2002 | Ford | 370/352 |
| 6,466,550 B1 | 10/2002 | Foster et al. | 370/261 |
| 6,501,740 B1 | 12/2002 | Sun et al. | 370/261 |
| 6,539,087 B1 | 3/2003 | Walsh et al. | 379/202.01 |
| 6,580,695 B1 | 6/2003 | Klück et al. | 370/261 |
| 6,625,271 B1 | 9/2003 | O'Malley et al. | 379/202.01 |
| 6,657,975 B1 | 12/2003 | Baxley et al. | 370/260 |
| 6,697,476 B1 | 2/2004 | O'Malley et al. | 379/202.01 |

OTHER PUBLICATIONS

J. Larry Summers et al., "Internet-Enabled Conferencing System and Method Accommodating PSTN and IP Traffic," U.S. Appl. No. 09/514,988, 38 pages, filed Feb. 29, 2000.

Conference Setup

Account Number: 154
Account Name: eMeeting.net

| | |
|---|---|
| Setup Type | Detailed ▼ |
| Start Date | 03/01/2000 ▼ |
| Start Time | 09 ▼ : 00 ▼  AM ▼ CDT  } 202 |
| Duration | 02 ▼ Hrs 00 ▼ Mins ← 204 |
| Maximum Users | 50 ▼ ~206 |
| User 1 | [_____] |
| User 2 | [_____] |
| ⋮ | ⋮ |
| User 50 | [_____]  } 208 |
| Conference Password | [_____] ~210 |
| Confirmation Method | E-mail ▼ ~212 |

[ Schedule Conference ]

*FIG. 5*

Conference Confirmation

The following information has been emailed to greg@bigco.com. If you would like to E-Mail or Print this information, click here.

 Conference Information for
Greg Jones

| Scheduled by Larry Smith | Scheduled 02-07-2000 01:09PM |
|---|---|
| Account number 154 | |

This is to notify you of a scheduled Meet Me conference from eMeeting.net

Schedule:
Your Meet Me conference is scheduled for 50 users on 03/01/2000 and will last from 09:00AM until 09:59AM for a duration of 60 minutes.

Conference phone number:
(800) 555-6789

Conference IP address:
209.144.22.74

Your conference ID is: 710
Your conference password is: 9999

Participating through your telephone:
1. Dial (800) 555-6789.
2. When prompted for conference ID, enter 710#.
3. When prompted for Password, enter 9999#.

Participating through the Internet:
1. Run Microsoft NetMeeting.
2. Go to the Tools menu, select Options.
3. Select the My Information tab.
4. In the First Name field, enter 710.
5. In the Last Name field, enter 9999.
6. Click OK.
7. Click the large Call button.
8. In the Address field, enter 209.144.22.74.
9. Click Call.

If you need any help, call (214) 555-5353. Thank you for using eMeeting.net Meet Me Conferencing.

 Setup another conference
 Return to main account screen

*FIG. 6*

INTERNET-ENABLED CONFERENCING SYSTEM AND METHOD ACCOMMODATING PSTN AND IP TRAFFIC

RELATED APPLICATIONS

This application is a continuation of U.S. application Ser. No. 09/515,338 filed Feb. 29, 2000 and entitled "Internet-Enabled Conferencing System and Method Accommodating PSTN and IP Traffic," which has issued as U.S. Pat. No. 6,876,734.

This application is related to U.S. application Ser. No. 09/514,988 filed Feb. 29, 2000 and entitled "Internet-Enabled Conferencing System and Method Accommodating PSTN and IP Traffic," which has issued as U.S. Pat. No. 6,961,416.

TECHNICAL FIELD OF THE INVENTION

This invention relates in general to the field of communications and in particular to an Internet-enabled conferencing system and method accommodating PSTN and IP traffic.

BACKGROUND OF THE INVENTION

Communications needs continue to expand on a global scale. With the growing demand for communications, there is a concurrent expansion in the demand for audio, video, and combined audio and video conferencing. The ability for multiple parties to communicate with one another is very much a requirement for modern business. As individuals and organizations seek to decrease their costs and improve productivity, identifying relatively inexpensive, reliable, and effective conferencing solutions has become increasingly important. This is particularly true considering the recent rise in importance of packet-based audio, video, and other communications relying on Internet Protocol (IP).

Multi-party bridging provides a foundation for conferencing and has existed for some time in the form of analog ("dumb") bridges handling public switched telephone network (PSTN) traffic, which require operator services or other appropriate intelligent front end capability. The number of conferees is typically limited to eight or fewer. Similar limitations exist for prior conferencing systems for handling IP traffic. Such systems are host-based, with bridging being performed using a general purpose central processing unit (CPU) within a "Media Server" or other computer system, and provide limited teleconferencing capacity. In many cases, a "push to talk" control key must be manipulated. Desirable features such as echo cancellation, automatic gain control, and simultaneous speaking are very difficult to implement. Furthermore, due to the nature of IP networks, packets are often lost or delayed, distorting voice audio or freezing an image on the viewing screen. Even in managed IP networks, congestion may cause temporary data loss for one or more conferees. Such quality of service issues must be carefully considered in assessing the usefulness of conferencing systems expected to handle IP traffic. While possibly adequate for casual use, such systems are typically not sufficiently robust for important business communications.

To deploy a traditional PSTN conference bridge within an IP network requires a separate "gateway" to convert the IP packets carrying conference audio and video into digital or analog telephone traffic before routing it to the bridge. In addition to other deficiencies noted above with respect to existing pure PSTN or pure IP solutions, such gateways must be paid for and managed. As a result of these and other deficiencies, previous techniques are often inadequate to meet conferencing requirements of many business and other users.

SUMMARY OF THE INVENTION

According to the present invention, disadvantages and problems associated with previous conferencing techniques are substantially reduced or eliminated.

According to one embodiment of the present invention, a system for scheduling a conference between callers includes a database that stores scheduling information indicating at least a start time, a duration, and a maximum number of callers for one or more scheduled conferences, the scheduling information reflecting available conferencing resources. A server complex coupled to the database communicates, to a requesting Internet Protocol (IP) user, at least one page including one or more scheduling input fields. The server complex receives scheduling input from the requesting IP user for a requested conference according to the scheduling input fields. The server complex accesses the database to determine, according to the scheduling input, whether sufficient conferencing resources are available for the requested conference. If so, the server complex allocates at least some of the available conferencing resources to the requested conference and generates confirmations of the requested conference for communication to the callers.

According to another embodiment of the present invention, software associated with an IP user includes conference scheduling software and control software. The scheduling software provides at least one page to the IP user that includes one or more scheduling input fields for a requested conference involving at least one public switched telephone network (PSTN) caller and at least one IP caller. The scheduling software receives scheduling input from the IP user for the requested conference, according to the scheduling input fields, for communication to a server complex associated with the conference bridge. The control software is used for controlling selected aspects of a conference in progress that involves at least one public switched telephone network (PSTN) caller and at least one IP caller. The control software, in response to the IP user being provided with current state information for the conference, receives control input from the IP user for communication to a conference bridge in which the conference is implemented.

In yet another embodiment, a system for conferencing callers includes a database that stores current state information for one or more conferences, at least one of the conferences involving at least one PSTN caller and at least one IP caller. A conference bridge node coupled to the database generates conference traffic for communication to the callers, generates current state information for each conference for communication to IP users associated with the conferences and, in addition, periodically communicates current state information for each conference to the database for storage. The system also includes a server complex, coupled to the database and to the conference bridge node, that periodically accesses the stored current state information for at least one conference associated with an IP user and communicates at least some of that stored current state information to the IP user.

The present invention provides a number of important technical advantages over previous conferencing systems. Unlike those systems, the present invention provides simultaneous conferencing of both PSTN and IP callers without requiring a separate IP gateway device to convert IP signals received from the IP callers into a format suitable for the conference bridge. The present invention allows IP callers to terminate directly to the conferencing system, without converting associated IP packets to PSTN signals prior to conferencing. The present invention also provides computing resources that are dedicated to conferencing, reducing or eliminating the conferee limitations associated with previous conferencing systems. The present invention incorporates a physically segmented backplane bus, one segment within each node and separated from all other segments, such that the nodes may be housed in a single chassis while communicating incoming user signals and outgoing conference traffic with one another using the TDM bus. The system typically has a lower initial cost relative to previous large-scale digital conferencing systems, and is readily scalable as conferencing needs grow.

A server complex, an associated database, and software associated with one or more IP users may cooperate to allow the IP users to schedule conferences, change scheduled conferences, monitor conferences already in progress, exercise substantially real-time control over conferences they are moderating, monitoring, or participating in, and perform other appropriate activities. In response to a conference being scheduled, PSTN and IP callers are provided with confirmations containing information needed to join the conference, including a telephone number (PSTN caller) or an IP address (IP caller). As a result of these and other important technical advantages over previous techniques, the present invention is well suited for modern distributed conferencing environments involving PSTN and IP traffic. Other technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which:

FIG. 5 illustrates an exemplary web page for scheduling a conference;

FIG. 6 illustrates an exemplary conference confirmation;

DETAILED DESCRIPTION OF THE INVENTION

Figure 1:
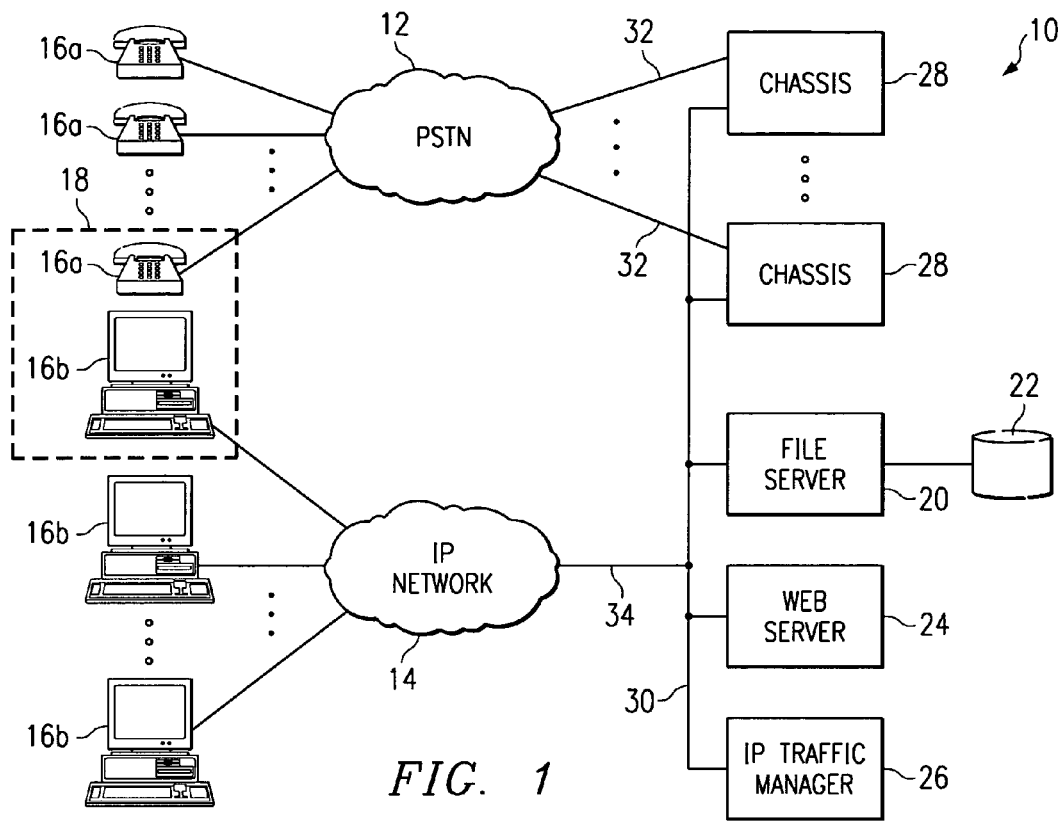
FIG. 1 illustrates an exemplary Internet-enabled conferencing system that accommodates PSTN and IP calls.

FIG. 1 illustrates an exemplary Internet-enabled system 10 that provides audio, video, data or other conferencing for traffic originating within the public switched telephone network (PSTN) 12, within one or more Internet Protocol (IP) networks 14, or within both types of networks. Although PSTN 12 is discussed, PSTN 12 is meant to include any suitable telephone network or networks, public or private. One or more PSTN callers 16a are coupled to PSTN 12 and communicate audio, video, data, or other suitable PSTN traffic using PSTN 12. Similarly, one or more IP callers 16b are coupled to IP network 14 and communicate audio, video, data, or other suitable IP traffic using IP network 14, which may include one or more suitable local area networks (LANs), metropolitan area networks (MANs), wide area networks (WANs), a global computer network such as the Internet, or any other suitable network or networks that support IP communications. Callers 16a and 16b may be referred to in the singular as caller 16 and in the plural as callers 16, as appropriate. As indicated by dashed box 18, PSTN caller 16a may also be an IP caller 16b, depending on the associated device and the type of traffic that caller 16 is communicating. Typically, dual callers 16 may use PSTN 12 in communicating voice and other "narrowband" audio information, while using the higher bandwidth of IP network 14 to communicate video, multi-media, data, and other "broadband" information. The present invention contemplates caller 16 using PSTN 12 and IP network 14 in any suitable manner to communicate traffic.

System 10 includes file server 20 and associated database 22, web server 24, IP traffic manager 26, and one or more network interface chassis 28 coupled using a LAN or other suitable network 30 supporting IP communications. In one embodiment, each chassis 28 is coupled to PSTN 12 using a corresponding communications link 32. As described more fully below with reference to FIG. 3, each link 32 may include a separate trunk group dedicated to the corresponding chassis 28. LAN 30 is coupled to IP network 14 using link 34, which may be any communications link appropriate to communicate IP traffic between LAN 30 and IP callers 16b. Although a single complex of file server 20, associated database 22, web server 24, IP traffic manager 26, and multiple chassis 28 is shown, the present invention contemplates one or more such complexes (or components thereof) cooperating in any appropriate manner to provide Internet-enabled conferencing functionality for PSTN and IP callers 16 in a distributed conferencing environment.

File server 20 accesses and manipulates information contained in database 22 according to the operation of system 10. For each caller 16, database 22 may contain, in any suitable combination and without limitation: (1) one or more names or other caller identifiers; (2) one or more user passwords; (3) one or more customer identifiers with which user 16 is associated, identifying entities that may be billed for conferences that are set up by or otherwise involve caller 16; (4) one or more billing or other physical addresses; (5) one or more e-mail, IP, medium access control (MAC), or other electronic addresses; (6) one or more telephone numbers; (7) one or more images of caller 16, for display to one or more other callers 16 joined in conferences with caller 16; and (8) any other appropriate personal information. In one embodiment, such information may be maintained in the form of an address book for caller 16, some or all of which may be displayed or otherwise conveyed during a conference to caller 16, other joined caller 16, a conference moderator, a conference monitor, or other suitable person, automatically or on request. Such an address book may be integrated or otherwise compatible with one or more suitable software application providing e-mail, organizer, and any other functions, for example, MICROSOFT OUTLOOK.

File server 20 cooperates with components of chassis 28 during conferences, as appropriate. For example, and not by way of limitation, file server 20 may help provide interactive voice response (IVR) capabilities to interact with callers 16 wishing to join conferences. File server 20 may also facilitate the populating and periodic updating of database 22 with state information for conferences. For each scheduled conference, database 22 may maintain the following state information, in any suitable combination and without limitation: (1) a conference identifier; (2) a customer identifier associated with the entity that is to be billed for the conference; (3) a scheduled start date and time; (4) a scheduled stop date and time; (5) a scheduled duration; (6) the number of callers 16 anticipated or that have actually joined the conference; (7) the name or other identifier of each anticipated or joined caller 16; (8) the telephone number of each anticipated or joined caller 16; (9) the e-mail, IP, MAC, or other electronic address of each anticipated or joined caller 16; (10) an indicator of whether each anticipated or joined caller 16 is a PSTN caller 16a or an IP caller 16b; (11) a timeslot assigned to each joined caller 16, in which incoming traffic from that caller 16 is carried; (12) a conference timeslot assigned to each joined caller 16, in which outgoing conference traffic to the caller 16 is carried; (13) a conference password; and (14) any other appropriate state information associated with the setting up, progress, or tearing down of the conference.

In addition to being able to participate in conferences, one or more IP callers 16b may have access to conference control, web setup, and web monitoring software through an associated web browser or otherwise. Such IP callers 16b may be referred to as IP users 16b in connection with the use of such software. Although IP users 16b may participate in conferences as IP callers 16b, as described below IP user 16b need not participate in a conference as IP caller 16b to use such software. Web server 24 stores and pushes web pages, forms, e-mail notifications, and other suitable information to IP users 16b in connection with the setting up, progress, or tearing down of conferences. Web server 24 cooperates with conference control, web setup, and web monitoring software associated with IP user 16b to provide IP user 16b with an Internet-enabled interface to the conferencing resources associated with chassis 28. Web server 24 also supports resource allocation software used during operation of system 10 to determine, before allowing a requested conference to be set up, whether system 10 can support the conference and its various parameters. Resource allocation in system 10 is described more fully below with reference to FIG. 3. Where appropriate, file server 20 individually, web server 24 individually, or the combination of file server 20 and web server 24 may be referred to as a server complex.

Figure 2:
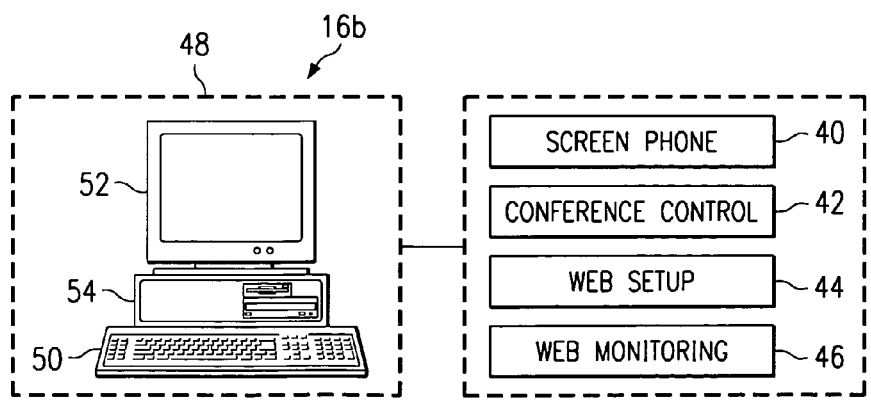
FIG. 2 illustrates an exemplary IP user.

FIG. 2 illustrates an exemplary IP user 16b that supports a voice over IP (VoIP) "screen phone" 30 or another ITU-T H.323 compatible end station suitable to communicate IP traffic using IP network 14. An example of such a screen phone is MICROSOFT NETMEETING. IP user 16b also supports conference control software 32 suitable for use in connection with the setting up, progress, and tearing down of conferences according to the operation of system 10. IP user 16b may further support web setup software 44 and web monitoring software 46, which may be integral to or separate from one another and conference control software 42. Web setup software 44 allows IP user 16b to set up conferences, using an associated web browser or otherwise, in the manner described in FIG. 4. If appropriate according to the authorization of user 16b as administrator, moderator, or otherwise, web monitoring software 44 allows user 16b to monitor some or all ongoing conferences, using an associated web browser or otherwise, in the manner described in FIG. 8. In one embodiment, a system administrator might be entitled to monitor and receive information concerning some or all conferences and sub-conferences, while a moderator or monitor might be entitled to monitor and receive information concerning only a particular conference and any of its associated sub-conferences.

IP user 16b is associated with at least one computer 48 that includes an input device 50 such as a keypad, touch screen, microphone, or any other device to accept information. An output device 52 of computer 48 may convey information to user 16b associated with the setting up, progress, and tearing down of conferences. Input device 50 and output device 52 may support computer diskettes, CD-ROMs, or other fixed or removable storage media suitable to receive output from and provide input to user 16b and to components of system 10 through IP network 14. A processor 54 and associated volatile or non-volatile memory may execute instructions and manipulate information according to the operation of system 10. Where appropriate, reference to IP user 16b is meant to include computer 48, whether alone or in combination with a human user, unless otherwise indicated. Screen phone 40 operates on computer 48 and allows IP caller 16b to communicate IP traffic for conferences. Conference control software 42, web setup software 44, and web monitoring software 46 operate on computer 48 and collectively provide IP user 16b with an Internet-enabled interface to the resources and functionality of system 10, through an associated web browser or otherwise.

Figure 3:
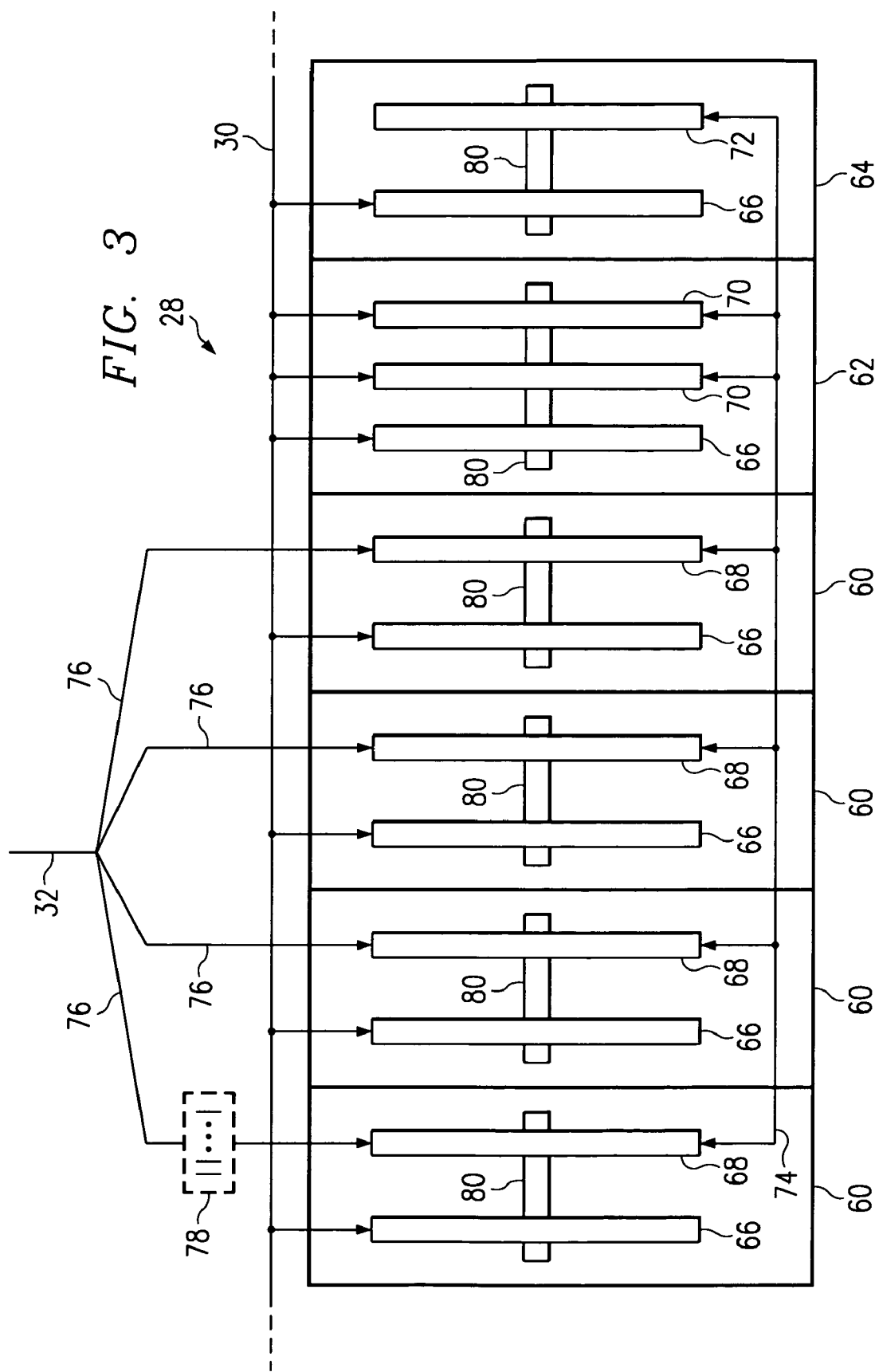
FIG. 3 illustrates an exemplary chassis.

FIG. 3 illustrates an exemplary chassis 28 that includes voice nodes 60, a VoIP node 42, and a conference bridge node 44. Each node 40, 42, and 44 includes a dedicated central processing unit (CPU) card 66, which may incorporate a single board computer or any other suitable processing entity. In addition, voice nodes 60 and VoIP node 42 each include one or more voice traffic cards 48 or VoIP traffic cards 70, as the case may be. Although four voice nodes 60 and a single VoIP node 42 are shown, the present invention contemplates chassis 28 including more or fewer voice nodes 60 and VoIP nodes 62 according to the traffic chassis 28 is intended to support and the relative capacities of nodes 50 and 42. Similarly, although voice nodes 60 are each shown as including a single voice traffic card 48, and VoIP node 42 is shown as including two VoIP traffic cards 70, the present invention contemplates more or fewer traffic cards 48 and 50 according to particular needs. In addition to its CPU card 66, conference bridge node 44 includes a conference card 72 within which one or more conferences between callers 16 are implemented.

The voice cards 68, VoIP card 70, and conference card 72 are coupled to and communicate user traffic with each other using a time division multiplexed (TDM) bus 74. TDM bus 74 may be an ITU-T H.100 Peripheral Component Interconnect (PCI) or ITU-T H.110 compact PCI (cPCI) bus, a Signaling Computing bus (SCbus), a Multi-Vendor Integration Protocol (MVIP) bus, or any other TDM bus suitable to communicate user traffic between nodes 40, 42, and 44 during operation of system 10. As discussed above, link 32 for each chassis 28 may include a separate trunk group. Each such trunk group may be associated with one or more particular 800 or other telephone numbers, such that all calls from callers 16a to that telephone number are routed to a particular chassis 28. As shown in FIG. 3, link 32 may include at least one T1, E1, or other appropriate digital telephone line 76 for each voice node 60. As further illustrated using the dashed oval 78, each voice node 60 may have multiple such lines 54, depending on the traffic voice node 60 is intended to support and the bandwidth associated with each line 76. In a particular embodiment, each of the voice cards 48 supports 48 ports and communicates with PSTN 12 using two T1 lines 76, each of the VoIP cards 70 supports 30 ports, and chassis 28 is able to support conferences involving 252 total callers 16, although as discussed above chassis 28 may be configured to support any appropriate number of callers 16.

The conferee limitations associated with previous conferencing systems are due, at least in part, to their use of software that depends on the primary CPU resources of the computer system on which it runs to manipulate the conference traffic. Even a relatively fast INTEL PENTIUM processor, for example, typically only supports seven or eight conferees in such an environment. In contrast to previous systems, system 10 provides conferencing functionality using a dedicated conference card 72 in conference node 44, having dedicated computer resources, with the desirable result that system 10 does not suffer from the same capacity limitations plaguing such previous systems. As a result, system 10 provides an important technical advantage over such systems.

In general, CPU card 66 within each voice node 60 and VoIP node 62 provides appropriate logic used in connection with the setting up, progress, and tearing down of conferences that involve associated callers 16. This may include answering calls from callers 16, detecting the dual tone multi-frequency (DTMF) or other digits that callers 16 enter, providing appropriate IVR capabilities for interaction with callers 16, determining whether callers 16 who call in have provided a valid password to access the conference, determining whether callers 16 who call in and provide a caller identifier were previously identified during "detailed" conference setup (such that the names, images, and other personal information associated with these callers 16 may be conveyed to joined users 16), and any other suitable activities. CPU cards 66 within voice nodes 60, VoIP node 62, and conference bridge node 64 may cooperate with file server 20 to access and manipulate information contained in database 22 in providing such functionality.

Voice cards 48 in voice nodes 60 receive the digitized and coded voice signals of PSTN callers 16a from lines 76 and, according to instructions from CPU card 66 in conference bridge node 64, place these signals on TDM bus 74 for communication to conference card 72 in conference bridge node 64. In one embodiment, the signals for each PSTN caller 16a are placed in a corresponding pre-assigned incoming timeslot on TDM bus 74, this association between PSTN callers 16a and incoming timeslots being "nailed up" or otherwise specified upon scheduling of the conference. Similarly, VoIP cards 70 within VoIP node 62 receive IP packets for IP callers 16b from LAN 30 and, according to instructions from CPU card 66, convert the packetized voice signals of IP callers 16b as appropriate and place them in pre-assigned incoming timeslots on TDM bus 74 for communication to conference card 72.

In one embodiment, CPU cards 66 within chassis 28 are configured in a client-server architecture, with voice nodes 60 and VoIP node 62 operating as "clients" subject to the control of "server" CPU card 66 within conference bridge node 64. In response to a caller 16 calling in and connecting to a voice node 60 or VoIP node 62, CPU card 66 of conference bridge node 64 receives signaling information from CPU cards 66 of that voice node 60 or VoIP node 62 using LAN 30. In one embodiment, the signaling information received from CPU card 66 of voice node 60 or VoIP node 42 includes, for each user 16 that calls in, at least the conference identifier such that CPU card 66 of conference bridge node 64 can then determine the appropriate conference for caller 16. Conference card 72 receives all incoming timeslots carried on TDM bus 74 from voice cards 68 and VoIP card 70.

For outgoing conference traffic, the CPU card 66 of conference bridge node 64 instructs voice nodes 60 and VoIP node 62 which timeslot on TDM bus 74 to read for each caller 16. In one embodiment, each joined caller 16 will receive conference traffic corresponding to all the other joined caller 16, but will not receive the caller's own voice or other signals. Thus, for example and not by way of limitation, if three callers 16 have been joined in a conference, the first caller 16 will receive the voice signals of only the second and third callers 16, the second caller 16 will receive the voice signals of only the first and third callers 16, and the third caller 16 will receive the voice signals of only the first and second callers 16. Where IP user 16b or other conference moderator has opted to mute a joined caller 16 using conference control software 42, voice or other signals for the muted caller 16 will not be communicated to IP user 16b or, instead or in addition, to other joined callers 16. Conference traffic received at voice cards 68 and VoIP card 70 from the conference card 72 is communicated to appropriate joined callers 16a and 16b using lines 76 and LAN 30, respectively.

The cards within a particular node 60, 62, or 64 communicate with one another using a signaling backplane bus 80, which is physically segmented from other buses 58 in chassis 28 such that signaling information carried over bus 80 is not communicated from node 60, 62, or 64 to another node 60, 62, or 64 within chassis 28. Due to typical hardware limitations, each bus 80 can have at most one driver, in this case associated CPU card 66. Providing multiple segmented buses 80—one for each node 60, 62, and 64—allows multiple nodes 60, 62, and 64 to communicate conference traffic using a single TDM bus 74 within a single chassis 28, providing another important technical advantage. For example, if buses 80 were not segmented, each of the nodes 60, 62, and 64 would require a separate chassis and a specialized card to communicate its TDM conference traffic from its chassis to chassis of other nodes 60, 62, and 64. According to the present invention, however, any voice card 68, VoIP card 70, or conference card 72 within chassis 28 may communicate information onto and receive information from any timeslot on TDM bus 74.

As described more fully below, this helps enable many more callers 16 to join a conference than would be possible with prior systems, which typically limit the total number of conferees to eight or fewer. As just an example, in the particular embodiment in which chassis 28 supports 252 total callers 16, three of the many possible allocations of conferencing resources might include one conference of up to 252 callers 16, two conferences of up to 126 callers 16 each, and three conferences of up to 84 callers 16 each. However, the conferencing capacity of chassis 28 may be allocated to one or more conferences in any suitable manner, according to particular needs. The present invention contemplates any combination of conferences and conferees within the limitations of conference bridge node 64 and TDM bus 74.

Furthermore, unlike prior conferencing systems supporting both PSTN and IP callers, system 10 does not require a separate IP gateway device to convert packetized IP traffic to PSTN traffic prior to conferencing. Instead, IP traffic may terminate directly at VoIP card 70 within chassis 28. According to the present invention, the IP traffic is received from IP caller 16b at VoIP card 70, formatted as appropriate, and placed onto the incoming timeslot corresponding to IP caller 16b on TDM bus 74 for conferencing. In a similar manner, VoIP card 70 reads the outgoing conference traffic for IP caller 16b from the conference timeslot corresponding to IP caller 16b on TDM bus 74, according to instructions from conference node 46, formats it as appropriate, and communicates IP traffic to IP caller 16b. For PSTN caller 16a, the incoming and outgoing operations are analogous, except that no packetizing or depacketizing is necessary. Accommodating both PSTN and IP traffic, seamlessly and simultaneously, while eliminating the cost, complexity, and reliability concerns associated with a separate IP gateway device is another important technical advantage of the present invention.

Figure 4:
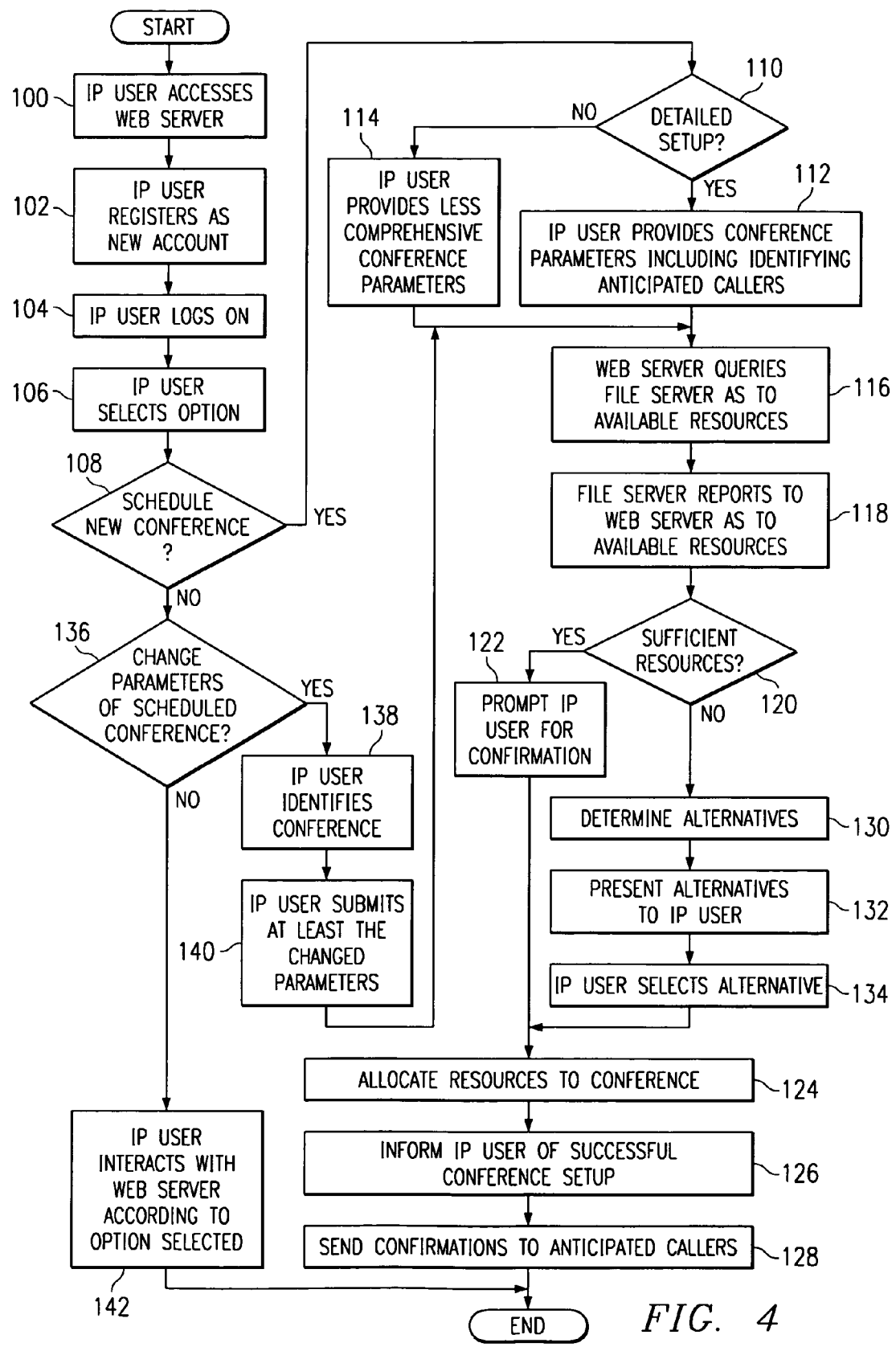
FIG. 4 illustrates an exemplary method of scheduling a conference.

FIG. 4 illustrates a method of scheduling a conference. The method begins at step 100, where IP user 16b uses associated web setup software 44, through a web browser or otherwise, to access web server 24 and its resources. Web server 24 pushes suitable web pages to IP user 16b according to input from IP user 16b and the operation of system 10. At step 102, if IP user 16b is a new user to system 10, IP user 16b may register with system 10 as a new account, providing requested contact, billing, and any other suitable information. IP user 16b logs on using the corresponding account number and password at step 104 and, at step 106, selects an option from among a number of possible options. Options may include but are not limited to: (1) schedule a conference, (2) change one or more parameters associated with a scheduled conference, and (3) edit an address book for IP user 16b. If IP user 16b opts to schedule a conference at step 108, the IP user 16b may select a "detailed" setup, in which case the IP user 16b selects from an address book or otherwise specifies all callers 16 anticipated to join the conference (in addition to other parameters for the conference), or an "express" setup, in which case IP user 16b specifies only minimal parameters for the conference.

If IP user 16b selects "detailed" setup at step 110, IP user 16b provides suitable conference parameters at step 112. As illustrated in FIG. 5, which represents an exemplary hypertext markup language (HTML) or other page 200 pushed to IP user 16b from web server 24 during conference setup, parameters may include, in any suitable combination and without limitation: (1) the start date and time 202, (2) the duration 204 (or the stop date and time), (3) the maximum number 206 of callers 16, (4) the names or other identifiers 208 for all anticipated callers 16, (5) the conference password 210, and (6) the selected confirmation method 212. Referring again to FIG. 4, if at step 112 IP user 16b instead selects the "express" setup, IP user 16b provides less comprehensive conference parameters at step 114, which in one embodiment may simply include: (1) start date and time 202, (2) duration 204, and (3) maximum number 206 of callers 16. The present invention contemplates IP user 16b providing any appropriate conference parameters, whether in "detailed," "express," or any other mode to schedule a conference using the Internet-enabled front end associated with system 10.

At step 110, in response to receiving the conference parameters from IP user 16b at step 112 or 114, web server 24 queries file server 20 and its associated database 22 to determine whether sufficient resources are available to support the conference as it has been requested. For example, in a particular embodiment in which system 10 includes a single chassis 28 supporting 252 concurrent callers 16, assume two conferences each involving 100 callers 16 were previously scheduled to begin on March 1, the first from 9:00–11:00 a.m. and the second from 10:00–11:00 a.m. If IP user 16b has requested a conference for 50 callers 16 from 9:00–11:00 a.m. on March 1, then sufficient resources are available (since there will be at most 250 simultaneous callers 16 during any portion of the requested conference) and file server 20 reports this to web server 24 at step 118. However, if IP user 16b requested a conference for 60 callers 16 from 9:00–11:00 on March 1, or requested a conference for 160 callers from 9:00–10:00 on March 1, then sufficient resources are not available (since there would be up to 260 concurrent callers 16 for at least part of the requested conference) and file server 20 reports this information to web server 24 at step 118.

At step 120, if there are sufficient resources for the conference as it has been requested, web server 24 may prompt IP user 16b for confirmation at step 122 before web server 24, file server 20, and database 22 cooperate to allocate suitable resources to that conference at step 124. In one embodiment, this involves populating database 22 with some or all of the parameters for the conference, including an identifier assigned to the conference. Web server 24 informs IP user 16b of successful conference setup at step 126, sends e-mail, facsimile, page, telephone, or other suitable conference confirmations to all or selected anticipated callers 16 at step 128, and the method ends.

An exemplary conference confirmation 220 is illustrated in FIG. 6. In one embodiment, confirmation 220 provides to anticipated caller 16 the following, in any suitable combination and without limitation: (1) schedule or other general conference information 222; (2) the 800 or other telephone number 224 associated with the assigned chassis 28 for the conference (for PSTN callers 16a who will join using PSTN 12); (3) an IP address 226 associated with IP traffic manager 26 or with VoIP node 62 in assigned chassis 28 (for IP callers 16b who will join using IP network 14); (4) conference entry information 228 that caller 16 may provide before joining the conference, including the conference identifier, conference password, the caller identifier for the caller, or other suitable information; and (5) instructions 230 for joining the conference using either PSTN 12 or IP network 14, as appropriate. Confirmation 220 may provide any other suitable information to caller 16 according to particular needs.

Although an exemplary confirmation 220 is illustrated, confirmation 220 may have any appropriate format and content. Callers 16 receiving confirmations 220 may have an opportunity to send an e-mail or other reply to accept, tentatively accept, or reject participation in the conference. Confirmations 220 sent to anticipated PSTN callers 16a may be the same or different from confirmations 220 sent to anticipated IP callers 16b. For example, confirmations 220 sent to PSTN callers 16a may include only telephone number 224 and instructions 230 needed to join using PSTN 12, while confirmations 220 sent to IP callers 16b might include only IP address 226 and instructions 230 needed to join using IP network 14. In the alternative, for convenience or any other appropriate reason, confirmations 220 sent to all callers 16 may include the same information. For example, all confirmations 220 may include telephone number 224, IP address 226, and instructions 230 needed to join the conference using PSTN 12 and IP network 14, respectively.

Referring again to FIG. 4, if sufficient resources are not available for the conference as requested at step 120, then web server 24, file server 20, and database 22 cooperate to identify one or more alternatives that might be suitable to IP user 16b at step 130. For example, in the particular example discussed above, system 10 may determine that although the conference cannot be setup exactly as requested, sufficient resources exist on March 1 for a conference for 160 callers from 11:00 a.m to 1:00 p.m. (instead of from 9:00–11:00 a.m. One or more of the alternatives identified, according to any appropriate algorithm, are presented to IP user 16b at step 132, IP user 16b selects an identified alternative at step 134, and the method returns to step 124 for allocation of suitable resources. In one embodiment, the requested conference may be treated as a "block" of time of the requested duration 204 having the requested maximum number 206 of callers 16. To identify an alternative, web server 24, file server 20, and database 22 may cooperate to "slide" this time block forward, backward, or both forward and backward in time until it is consistent with the available resources.

Alternatively, the requested conference may be viewed as a "block" of callers 16 for which the requested start date and time 202, duration 204, or other parameters may be modified in identifying alternatives. These and other suitable schemes may be used until a predetermined number of alternatives are identified, the number of alternatives within a specified range of the requested conference (in terms of start time, duration, number of callers 16, or any other suitable parameters) have been exhausted, or any other conditions are satisfied, according to particular needs. As discussed more fully above with reference to FIG. 3, system 10 allocates resources to conferences dynamically in an on-line transaction processing (OLTP) environment, in substantially real time, so that requesting IP user 16b may be informed substantially immediately that the requested conference can be scheduled as requested or, if not, of one or more alternatives from which to choose. This provides an important technical advantage over systems relying on batch processing to allocate resources to conferences.

If IP user 16b does not wish to schedule a new conference at step 108, but instead selects the option to change one or more parameters for a scheduled conference at step 136, IP user 16b identifies the conference at step 138 and submits at least the parameters to be changed at step 140. The method then returns to step 116 for determination of the available resources. For example only, and not by way of limitation, IP user 16b may wish to add or delete one or more anticipated callers 16, scheduled start date and time 202, or duration 204. At least any anticipated callers 16 who are added or deleted may receive confirmation 220 or other suitable confirmation of this occurrence. Other callers 16 may also be notified of such changes. If start date and time 202 or duration 204 is changed, all anticipated callers 16 should preferably receive new confirmations 220 indicating such changes at step 128. If no changes are to be made to the conference parameters at step 136, IP user 16b has selected another option and interacts with web server 24 and other components of system 10 accordingly at step 142, and the method ends. For example, IP user 16b may have selected an option enabling IP user 16b to change an associated address book, review account information, or perform any other suitable operation, according to particular needs.

Figure 7:
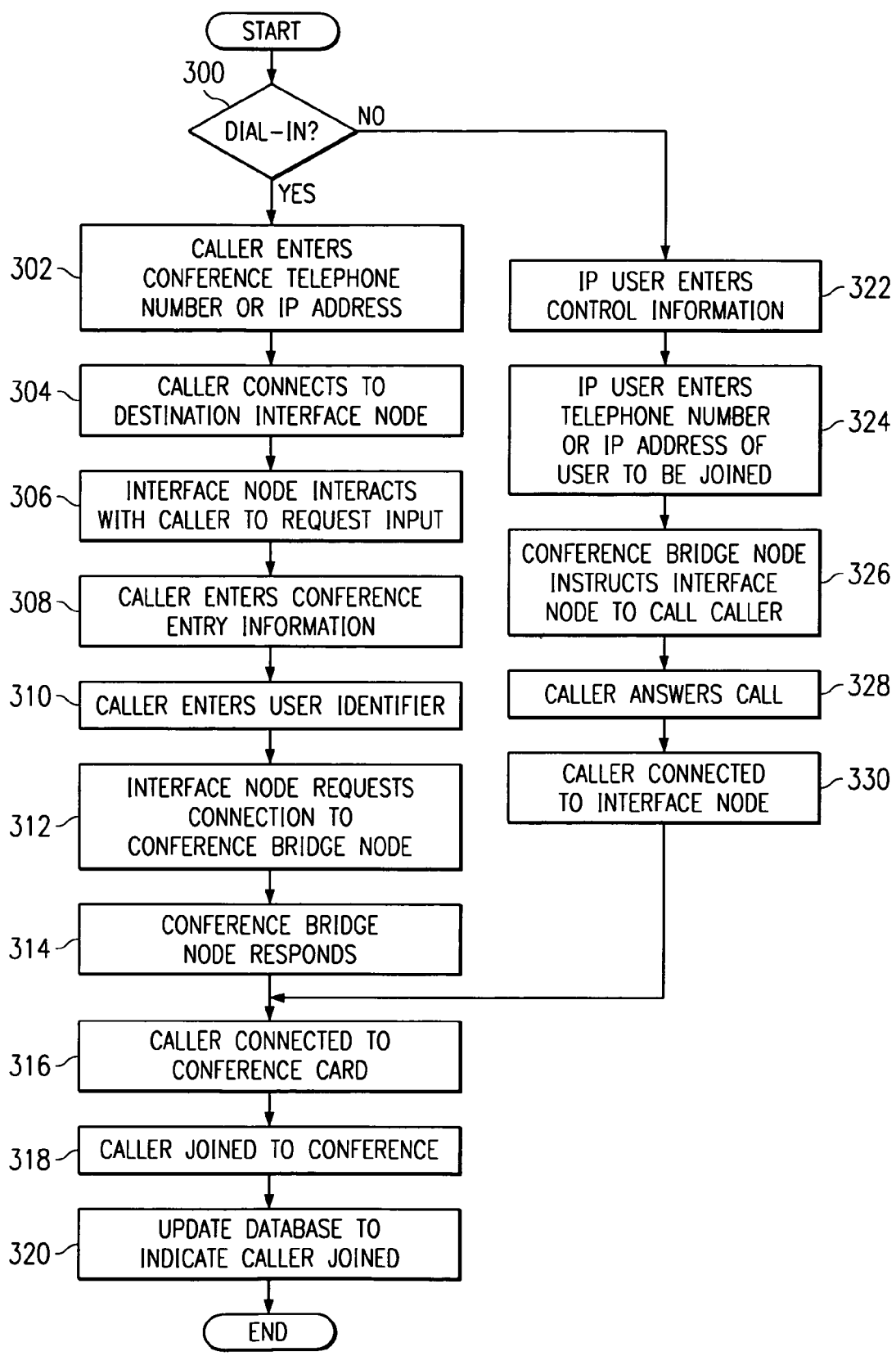
FIG. 7 illustrates an exemplary method of joining a caller to a conference.

Once a conference has been scheduled and the conference start time has arrived, callers 16 may join or be joined to the conference. FIG. 7 illustrates an exemplary method of joining caller 16 to a scheduled conference, using either a "dial-in" procedure, a "dial-out" procedure, or a combination of these. The present invention contemplates using either or both of procedures to join callers 16 to a particular conference, according to particular needs. Although the joining of a typical caller 16 is discussed, the present invention contemplates a joining a conference moderator or monitor in an analogous manner. If caller 16 is calling in to join the conference at step 300 ("dial-in"), caller 16 enters at step 302 the conference telephone number 224 (PSTN caller 16a) or IP address 226 (IP caller 16b) previously provided to the caller 16 in confirmation 220. At step 304, caller 16 connects to corresponding voice node 60 (PSTN caller 16a) or VoIP node 62 (IP caller 16b) within assigned chassis 28. As described above, if IP address 226 within confirmation 220 is for IP traffic manager 26, rather than for one of the VoIP cards 70 within chassis 28, IP caller 16b may first connect to IP traffic manager 26, which is responsible for routing IP user 16b to the destination VoIP card 70.

Voice node 60 or VoIP node 62 may interact with caller 16 using associated IVR capabilities or otherwise, to request input from caller 16 at step 306. At step 308, caller 16 enters conference entry information 228 previously provided in confirmation 220. At step 310, caller 16 may further provide an associated caller identifier to allow the name, stored image, and any other personal information for caller 16 to be conveyed to one or more other callers 16 that have already joined or will later join the conference. At step 312, CPU card 66 of voice node 60 or VoIP node 62 communicates a request to CPU card 66 of conference bridge node 64 to connect caller 16 to conference card 72 to join the conference. CPU card 66 of conference bridge node 64 responds to the request at step 314 and, at step 316, caller 16 is connected to conference card 72. Caller 16 may need to provide a personal entrance code used for auditing participation in the conference, roll call, or any other suitable purpose.

At step 318, caller 16 is joined to the conference, such that: (1) voice signals or other information originating at caller 16 may be received at voice card 68 of VoIP card 70, formatted if necessary, and placed onto TDM bus 74 in the corresponding timeslot for communication to conference card 72; and (2) conference traffic from all or selected other callers 16 may be placed on TDM bus 74 in the assigned conference time slot for communication to voice card 68 or VoIP card 70, properly formatted if necessary, and communicated to caller 16 using PSTN 12 or IP network 14. Substantially simultaneous with caller 16 being joined, conference node 52, file server 20, and database 22 cooperate at step 320 to update database 22 with information indicating caller 16 (whether or not identified according to a caller identifier) is joined, and the method ends.

If a moderator or another authorized IP user 16b is calling out to join caller 16 to the conference at step 300 ("dial-out"), rather than caller 16 calling in to join, IP user 16b uses conference control software 42 to enter suitable control information at step 322, which may include at least conference entry information 228. At step 324, IP user 16b enters the telephone number 224 (PSTN caller 16a) or IP address 226 (IP caller 16b) for the caller 16 to be joined. At step 326, conference bridge node 64 instructs appropriate voice node 60 or VoIP node 62 to place an outgoing PSTN or IP call to caller 16. Caller 16 answer the call at step 328, is connected to voice node 60 or VoIP node 62 within assigned chassis 28 at step 330, and the method proceeds to step 316, where caller 16 is connected to conference card 72 to be joined to the conference. It may be desirable to require callers 16 to provide a caller identifier or other authentication information prior to receiving conference traffic, as a security precaution.

Callers 16 joined in a dial-out conference may participate immediately on being joined or placed on hold until all anticipated callers 16 are joined. In response to caller 16 joining, an entry tone or other indicator may be provided to other joined callers 16. The name, image, and other personal information for new caller 16 may be provided to other joined callers 16 who are also IP users 16b (and thus have access to conference control software 42 or web monitoring software 46, through an associated web browser or otherwise) to make the conference more effective and more similar to face-to-face personal interaction. The present invention contemplates joining any number of callers 16 to the conference serially, substantially simultaneously, or in any other appropriate manner and at any time during the conference, subject to available resources.

In one embodiment, caller 16 may be played one or more pre-recorded messages before caller 16 begins to receive conference traffic. For example, one or more pre-recorded message may prompt caller 16 to provide a password or other authentication information, the authenticity of caller 16 may be verified, and then caller 16 may begin receiving conference traffic. A message may be informational, for example, informing caller 16 that caller 16 is about to join a specified conference relating to specified subject matter or involving specified individuals. A message may be intended only for one or more selected callers 16, the message being played to those callers 16 in response to the callers 16 joining the conference or in response to the callers 16 additionally providing their caller identifiers. The present invention contemplates any appropriate message played to caller 16 before, during, or after caller 16 is joined to the conference or a sub-conference.

Figure 8:
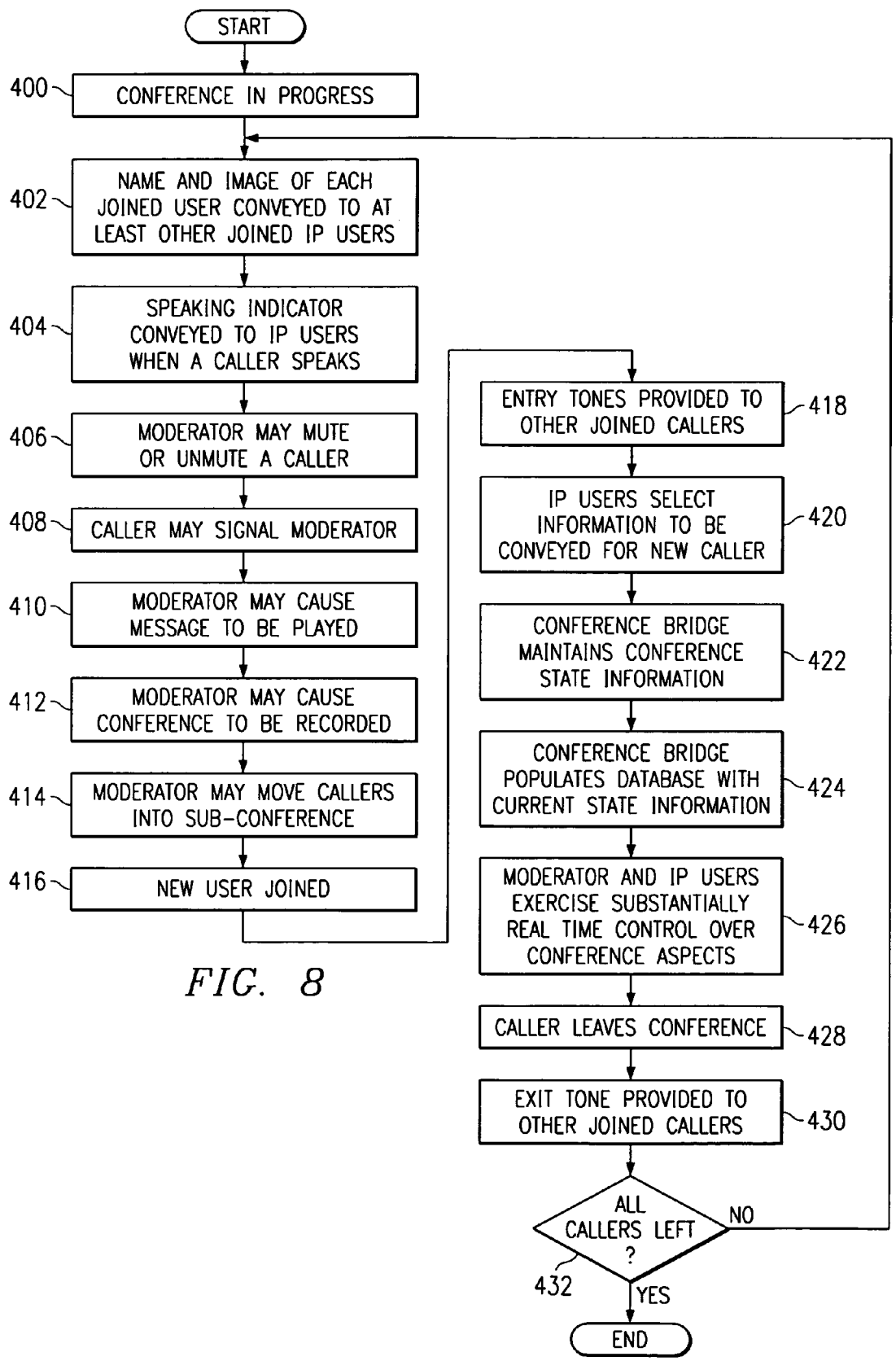
FIG. 8 illustrates an exemplary method of participating in a conference as a moderator, monitor, or other IP user.

FIG. 8 illustrates and exemplary method of participating in a conference as a moderator, monitor, or other IP user 16b using conference control software 42 or web monitoring software 46, through an associated web browser or otherwise. One or more moderators, monitors, or other IP users 16b may be referred to collectively as IP users 16b. Each IP user 16b may have a privilege level determining the operations available to that IP user 16b through conference control software 42 and web monitoring software 46 as a moderator, monitor, or other IP user 16b. The method begins at step 400, where some or all anticipated callers 16 are joined and the conference is progressing. At step 402, assuming these joined callers 16 provided a name or other caller identifier upon joining the conference, the name, stored image, or any other personal information for each joined caller 16 may be conveyed to IP users 16b. This allows at least the IP users 16b who are also IP callers 16b to participate in a more natural and more productive conference environment than would be possible using only audio information. It further allows IP users 16b to readily determine who is currently participating in the conference as callers 16. Although conveying names, images, and other information to callers 16 who are not also IP users 16b may be impractical or otherwise less desirable, the present invention contemplates providing suitable information, beyond conference traffic, to callers 16 who are not also IP users 16b.

In one embodiment, during the time a joined caller 16 is speaking, a colored or other speaking indicator may appear for IP users 16b at step 404 in association with the name, image, and other information for the speaking caller 16. The speaking indicator may be provided in response to detecting at conference card 72 that the signal energy for caller 16 exceeds a predetermined threshold or in any other appropriate manner. At step 406, IP user 16b may mute or subsequently unmute one or more callers 16 individually or in mass using conference control software 42. In one embodiment, to mute caller 16, conference control software 42 informs CPU card 66 of conference bridge node 64 and the CPU card 66 instructs conference card 72 to remove the information for caller 16 from appropriate conference timeslots on TDM bus 74. To unmute caller 16, conference card 72 is similarly instructed to insert the information for caller 16 into appropriate conference timeslots.

At step 408, a caller 16 may alert or otherwise signal the moderator or other IP user 16b using the associated telephone keypad, screen phone keyboard, or in another suitable manner. A tone may sound, which may be the same for some or all callers 16 or unique for each caller 16, or a colored or other indicator may appear in association with the name, image, or other information for the particular caller 16 who is signaling. For example, it may be desirable to preclude callers 16 from speaking until recognized. In such situations, an alert or other signal from a joined caller 16 to the moderator is akin to caller 16 raising a hand in a face-to-face meeting. Such a signaling feature may be used in conjunction with the muting feature described above to ensure that only one caller 16 may be heard at any time during the conference. Caller 16 may alert or otherwise signal the moderator to vote in response to a polling inquiry or in any other suitable manner, according to particular needs.

At step 410, the moderator may use conference control software 42 to cause a recorded announcement or message to be played to one or more callers 16. As described above with reference to FIG. 7, such a message may be played to a caller 16 at any time before, during, or after caller 16 is joined to the conference. For example only, and not by way of limitation, a message might be intended for one or more selected callers 16, those callers being required to provide their caller identifiers before receiving the message. Before or during the conference, at step 412, the moderator may use conference control software 42 to cause the conference to be recorded in whole or in part. A colored or other indicator may be conveyed to IP users 16b to inform them that the conference is being recorded. At step 414, the moderator may select and move callers 16 into one or more new or already progressing sub-conferences. Such "break-out" conferences may be initiated in response to one or more IP users 16b alerting or otherwise signaling the moderator. One or more callers 16 being moved to a sub-conference may be played a pre-recorded message before receiving conference traffic in the sub-conference. As discussed above, where a message is intended for selected callers 16, it may be desirable to require the selected callers 16 to provide their caller identifiers before receiving the message. Sub-conferences may be for the primary purpose of playing a message to the callers 16 moved to the sub-conference, while preventing callers 16 remaining in the main conference from hearing the message.

A new caller 16 may join the conference at step 416, according to a dial-in, dial-out, or other suitable procedure, and an entry tone or other indicator provided to other joined callers 16 at step 418. In one embodiment, at any time during the conference, the moderator may use conference control software 42 to "lock-out" or otherwise block the entry of new callers 16. The present invention contemplates joining new callers 16 at any time during the conference, subject to the availability of resources. In one embodiment, if the name, stored image, or other personal information for the newly joined caller 16 is not conveyed automatically to the moderator or other IP users 16b, the moderator or other IP users 16b may access an associated address book to select information to be conveyed at step 420.

For example, the address book may include the stored images of a number of potential callers 16 with which an already IP user 16b has had or might in the future have a conference. According to particular needs, a company might choose to include stored images of all of its employees in the address books of all its employees. Upon learning that one of the potential callers 16 has joined the conference, IP user 16b may access an associated address book to select the image of the newly joined caller 16 at step 420 such that it may be conveyed visually to the selecting IP user 16b. Where the conference is a videoconference, providing a stored image of each joined caller 16 may be redundant and thus less desirable, whereas providing the name of each joined caller 16 may still be a desirable feature even in that situation. IP users 16b may also label a newly joined caller 16 with suitable text to indicate a title, an employment position, a role with respect to the topic of the conference, or any other appropriate information.

As the conference proceeds, at step 422, CPU card 66 of the conference bridge node 64 maintains substantially real time state information for the conference and may communicate it to some (multi-cast) or all (broadcast) IP users 16b, making possible features such as those described above. At step 424, CPU card 66 of conference bridge node 64 cooperates with file server 20 to dynamically populate database 22 with the current state information for the conference. This may occur periodically according to any appropriate schedule or in response to appropriate events. The state information maintained in database 22 may be provided, in whole or in part, to IP users 16b using web monitoring software 46, through an associated web browser or otherwise. Based on the state information maintained at conference bridge node 64 and communicated to IP users 16b, the IP users 16b are able at step 424 to exercise substantially real time control over aspects of the conference, such as those described above, using conference control software 42 and possibly an associated web browser.

A joined caller 16 may leave the conference at any time at step 428, willingly or in response to the moderator disconnecting caller 16, and an exit tone or other indicator provided to other joined callers 16 at step 430. In one embodiment, to disconnect caller 16, CPU card 66 of conference bridge node 64 instructs CPU card 66 of voice node 60 or VoIP node 62 associated with caller 16, which in turn disconnects caller 16 from the associated voice card 68 or VoIP card 70. If all joined callers 16 have left the conference at step 432, the method ends. Otherwise, the conference continues in progress and the method returns to step 402 as described above. The present invention contemplates at least steps 404 through 414 (exemplary features), 416 (add caller 16 to the conference), and 428 (caller 16 leaves the conference) occurring in any relative order according to the progress of the particular conference.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for scheduling a conference between callers, comprising:
a database operable to store scheduling information indicating at least a start time, a duration, and a maximum number of callers for one or more scheduled conferences, the scheduling information reflecting available conferencing resources;
a server complex coupled to the database and operable to:
communicate, to a requesting Internet Protocol (IP) user, at least one page comprising one or more scheduling input fields;
receive scheduling input from the requesting IP user for a requested conference according to the scheduling input fields;
access the database to determine, according to the scheduling input, whether sufficient conferencing resources are available for the requested conference;
if sufficient conferencing resources are available, allocate at least some available conferencing resources to the requested conference; and
in response to determining sufficient resources are available, generate confirmations of the requested conference for communication to the callers.

2. The system of claim 1, wherein the scheduling input indicates at least a start time, a duration, and a maximum number of callers for the requested conference.

3. The system of claim 2, wherein the scheduling input further comprises a caller identifier for one or more callers.

4. The system of claim 1, wherein the scheduling information specifies a type of confirmation each caller is to receive.

5. The system of claim 1, wherein:
the confirmation for a public switched telephone network (PSTN) caller provides a conference telephone number; and
the confirmation for an Internet Protocol (IP) caller provides an IP address.

6. The system of claim 1, wherein the confirmation provides a conference telephone number and a conference Internet Protocol address.

7. The system of claim 1, wherein the confirmation provides conference entry information selected from the group consisting of:
a conference identifier; and
a conference password.

8. The system of claim 7, wherein the confirmation further provides a caller identifier for the particular caller receiving the confirmation.

9. The system of claim 1, wherein the confirmation provides instructions for joining the conference to each caller, each caller being selected from the group consisting of:
a public switched telephone network (PSTN) caller; and
an Internet Protocol (IP) caller.

10. The system of claim 1, wherein the server complex is further operable, if sufficient conferencing resources are not available, to:
generate alternative scheduling information for the requested conference; and
communicate the alternative scheduling information to the requesting IP user for acceptance.

11. The system of claim 1, wherein the server complex comprises at least a web server.

12. A method of scheduling a conference between callers, comprising:
storing in a database scheduling information indicating at least a start time, a duration, and a maximum number of callers for one or more scheduled conferences, the scheduling information reflecting available conferencing resources;
communicating at least one page from a server complex to a requesting Internet Protocol (IP) user, the page comprising one or more scheduling input fields;
receiving scheduling input from the requesting IP user for a requested conference according to the scheduling input fields;
accessing the database using the server complex to determine, according to the scheduling input, whether sufficient conferencing resources are available for the requested conference;
if sufficient conferencing resources are available, using the server complex to allocate at least some available conferencing resources to the requested conference; and
in response, generating a confirmation at the server complex for communication to the callers.

13. The method of claim 12, wherein the scheduling input indicates at least a start time, a duration, and a maximum number of callers for the requested conference.

14. The method of claim 13, wherein the scheduling input further comprises a caller identifier for one or more callers.

15. The method of claim 12, wherein the scheduling information specifies a type of confirmation each caller is to receive.

16. The method of claim 12, wherein:
the confirmation for a public switched telephone network (PSTN) caller provides a conference telephone number; and
the confirmation for an Internet Protocol (IP) caller provides an IP address.

17. The method of claim 12, wherein the confirmation provides a conference telephone number and a conference Internet Protocol address.

18. The method of claim 12, wherein the confirmation provides conference entry information selected from the group consisting of:
a conference identifier; and
a conference password.

19. The method of claim 18, wherein the confirmation further provides a caller identifier for the particular caller receiving the confirmation.

20. The method of claim 12, wherein the confirmation provides instructions for joining the conference to each caller, each caller selected from the group consisting of:
a public switched telephone network (PSTN) caller; and
an Internet Protocol (IP) caller.

21. The method of claim 12, further comprising, if sufficient conferencing resources are not available, using the server complex to:
generate alternative scheduling information for the requested conference; and
communicate the alternative scheduling information to the requesting IP user for acceptance.

22. The method of claim 12, wherein the server complex comprises at least a web server.

* * * * *